US011118495B2

(12) United States Patent
Tsuji et al.

(10) Patent No.: US 11,118,495 B2
(45) Date of Patent: Sep. 14, 2021

(54) EXHAUST GAS-PURIFYING SYSTEM AND AUTOMOTIVE VEHICLE

(71) Applicant: CATALER CORPORATION, Kakegawa (JP)

(72) Inventors: Makoto Tsuji, Kakegawa (JP); Hiroto Imai, Kakegawa (JP); Kou Sugawara, Kakegawa (JP); Shintaro Kobayashi, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 16/662,884

(22) Filed: Oct. 24, 2019

(65) Prior Publication Data
US 2020/0056529 A1 Feb. 20, 2020

Related U.S. Application Data

(63) Continuation of application No. PCT/JP2017/045815, filed on Dec. 20, 2017.

(30) Foreign Application Priority Data

Apr. 26, 2017 (JP) .............................. JP2017-087136

(51) Int. Cl.
*F01N 3/08* (2006.01)
*F01N 11/00* (2006.01)
(Continued)

(52) U.S. Cl.
CPC ........ *F01N 11/007* (2013.01); *B01D 53/9431* (2013.01); *F01N 3/0814* (2013.01);
(Continued)

(58) Field of Classification Search
CPC .... F01N 11/007; F01N 3/0814; F01N 3/0842; F01N 3/2066; F01N 2550/02; B01D 53/9431
See application file for complete search history.

(56) References Cited

U.S. PATENT DOCUMENTS 5,715,679 A * 2/1998 Asanuma ........... B01D 53/9481
60/276
5,865,027 A * 2/1999 Hanafusa .............. F01N 11/007
60/277
(Continued)

FOREIGN PATENT DOCUMENTS

CN 101023248 A 8/2007
CN 101627191 A 1/2010
(Continued)

OTHER PUBLICATIONS

International Search Report dated Mar. 20, 2018 in connection with PCT International Application No. PCT/JP2017/045815.
(Continued)

*Primary Examiner* — Matthew T Largi
(74) *Attorney, Agent, or Firm* — John P. White

(57) ABSTRACT

An exhaust gas-purifying system includes an exhaust gas-purifying unit that includes one or more exhaust gas-purifying catalysts, is supplied with the exhaust gas from a combustion engine, and purifies the exhaust gas so that the exhaust gas can be released to the atmosphere, a sensor that detects a concentration of nitrogen oxides contained in the purified exhaust gas, and a processing section that makes a judgment with respect to at least one of the exhaust gas-purifying catalysts, as to whether or not a performance is maintained at a sufficient level, based on the concentration detected by the sensor.

12 Claims, 12 Drawing Sheets

(51) Int. Cl.
    *B01D 53/94*     (2006.01)
    *F01N 3/20*     (2006.01)
    *F01N 3/035*     (2006.01)
    *F01N 3/28*     (2006.01)

(52) U.S. Cl.
    CPC ......... *F01N 3/0842* (2013.01); *F01N 3/2066* (2013.01); *F01N 3/035* (2013.01); *F01N 3/2828* (2013.01); *F01N 2330/06* (2013.01); *F01N 2370/02* (2013.01); *F01N 2510/06* (2013.01); *F01N 2550/02* (2013.01)

(56) References Cited

U.S. PATENT DOCUMENTS

| | | | |
|---|---|---|---|
| 6,167,695 B1* | 1/2001 | Itou | F01N 3/0814 60/274 |
| 6,263,666 B1* | 7/2001 | Kubo | F01N 13/009 60/277 |
| 6,499,293 B1* | 12/2002 | Surnilla | F01N 3/0842 60/285 |
| 9,845,756 B2* | 12/2017 | Bisaiji | F02D 41/1461 |
| 2010/0083637 A1* | 4/2010 | Sawada | F01N 3/0871 60/277 |

FOREIGN PATENT DOCUMENTS

| | | |
|---|---|---|
| CN | 104395573 A | 3/2015 |
| CN | 104411933 A | 3/2015 |
| EP | 1114921 A2 | 12/2000 |
| EP | 1114921 A2 | 7/2001 |
| EP | 2 119 882 A1 | 11/2009 |
| FR | 2 921 418 A1 | 3/2009 |
| JP | 9-144531 A | 6/1997 |
| JP | 2000-018023 A | 1/2000 |
| JP | 2003080081 A | 3/2003 |
| JP | 2010-180792 A | 8/2010 |
| JP | 2012-36856 A | 2/2012 |
| JP | 2012-219740 A | 11/2012 |
| JP | 2013-227930 A | 11/2013 |

OTHER PUBLICATIONS

Written Opinion (form PCT/ISA/237) dated Mar. 20, 2018 in connection with PCT International Application No. PCT/JP2017/045815.

English translation of the International Preliminary Report on Patentability dated Nov. 7, 2019 in connection with PCT International Application No. PCT/JP2017/045815.

Extended European Search Report dated Jul. 20, 2017 in connection with European Patent Application No. EP 17906982.8.

Extended European Search Report dated Jul. 17, 2020 in connection with European Patent Application No. EP 17906982.8.

Office Action dated Dec. 3, 2020 by the Chinese Patent Office, in connection with Chinese Patent Application No. 201780090031.2, filed Oct. 25, 2019.

* cited by examiner

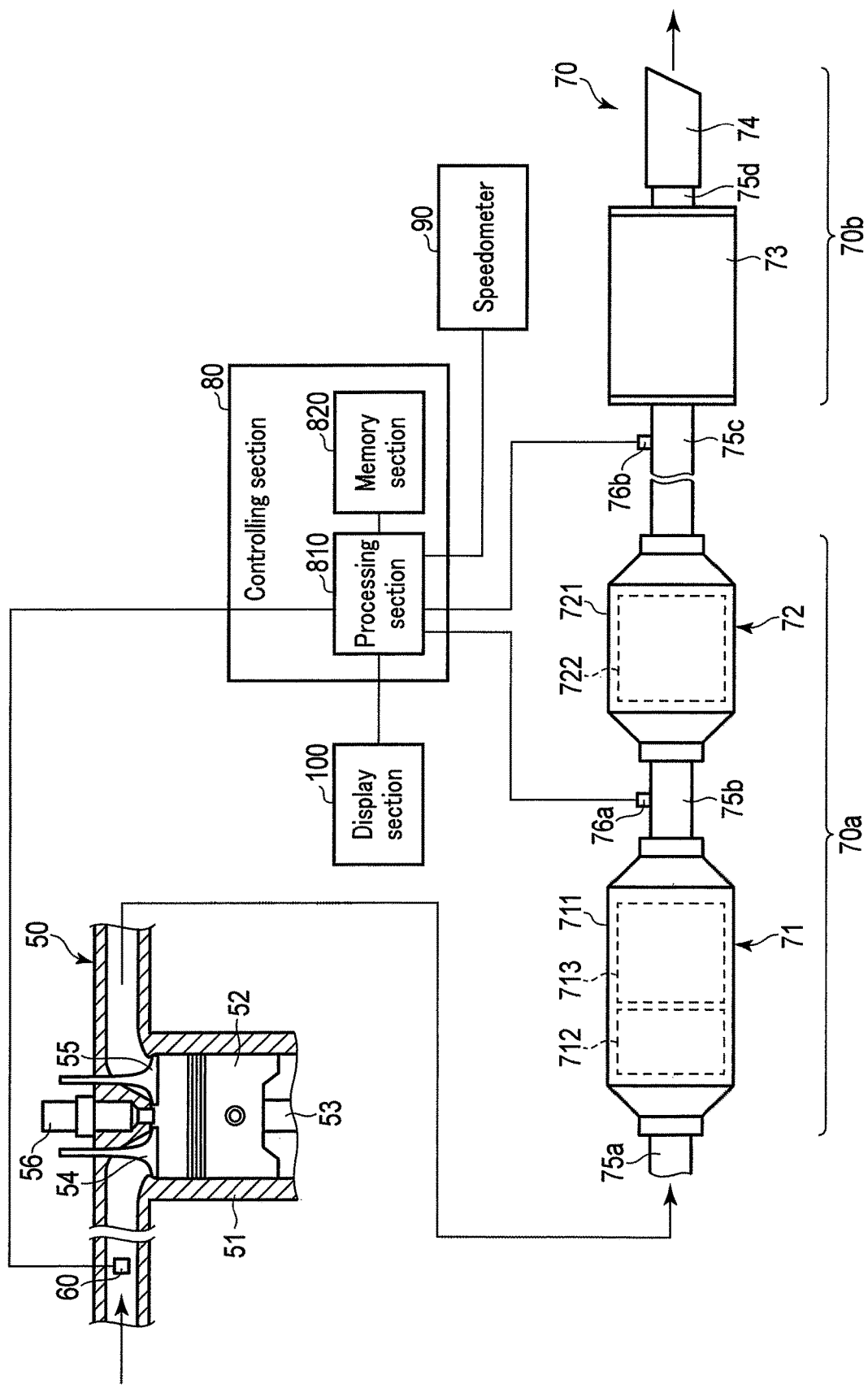
F I G. 2

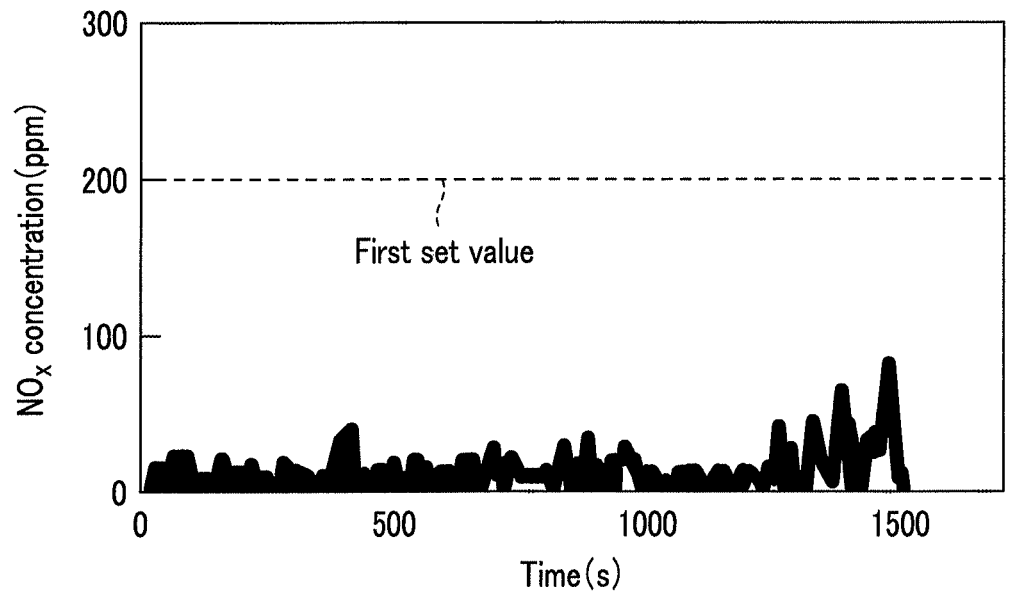
F I G. 4
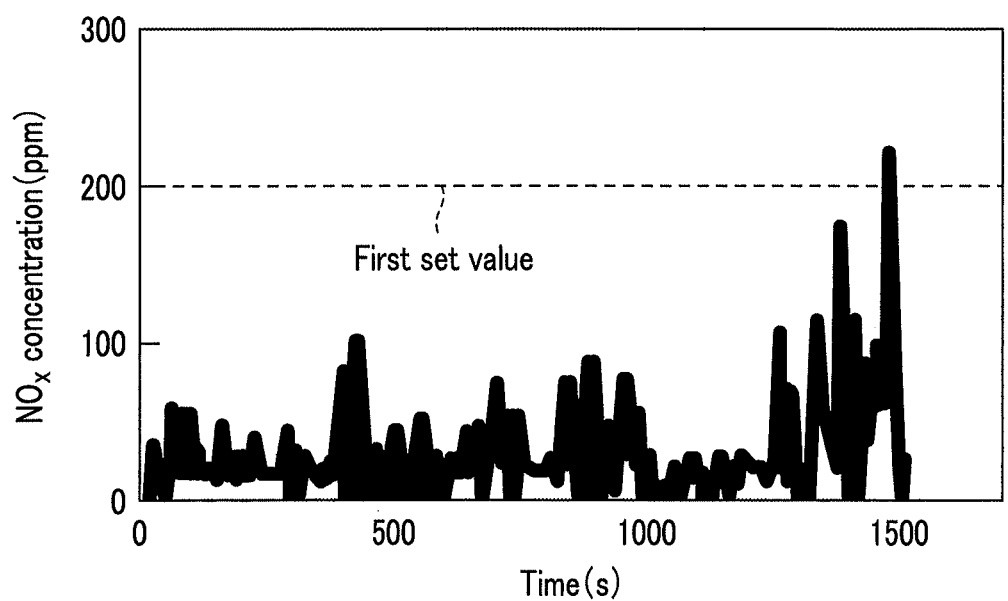
F I G. 5

EXHAUST GAS-PURIFYING SYSTEM AND AUTOMOTIVE VEHICLE

CROSS-REFERENCE TO RELATED APPLICATIONS

This application is a Continuation Application of PCT Application No. PCT/JP2017/045815, filed Dec. 20, 2017 and based upon and claiming the benefit of priority from prior Japanese Patent Application No. 2017-087136, filed Apr. 26, 2017, the entire contents of all of which are incorporated herein by reference.

BACKGROUND

1. Field

The present invention relates to an exhaust gas-purifying system and an automotive vehicle.

2. Description of the Related Art

An automotive vehicle mounted with a combustion engine such as a diesel engine purifies exhaust gas emitted by the combustion engine using one or more exhaust gas-purifying catalysts so that the exhaust gas can be released to the atmosphere. Therefore, the deterioration in performance of the exhaust gas purifying catalysts causes an increased concentration of harmful components in exhaust gas released to the atmosphere, for example, the concentration of nitrogen oxides ($NO_x$).

Jpn. Pat. Appln. KOKAI Publication No. 2000-18023 discloses a diagnostic apparatus that evaluates a deterioration degree of a $NO_x$-occluded catalyst. This diagnostic apparatus evaluates a deterioration degree of a $NO_x$-occluded catalyst based on a ratio between a $NO_x$ concentration at an inlet part of the $NO_x$-occluded catalyst and a $NO_x$ concentration at an outlet part of the $NO_x$-occluded catalyst that is obtained when the $NO_x$ concentration at the outlet part of the $NO_x$-occluded catalyst takes the minimum value during a period between a rich spike and a next rich spike.

Jpn. Pat. Appln. KOKAI Publication No. 2012-36856 discloses the diagnostic apparatus configured to evaluate a deterioration degree of a diesel oxidation catalyst for an exhaust gas-purifying system including the diesel oxidation catalyst and a selective reduction catalyst that is installed on the downstream side of the diesel oxidation catalyst and reduces $NO_x$ to nitrogen. This diagnostic apparatus includes a sensor characteristic storage means that stores a relationship between a ratio of a detection value output from a $NO_x$ sensor installed on the downstream side of the selective reduction catalyst to the amount of $NO_x$ in exhaust gas on the upstream side of the diesel oxidation catalyst, and a proportion of $NO_2$ in the exhaust gas on the downstream side of the selective reduction catalyst.

In this respect, the amount of $NO_x$ in the exhaust gas on the upstream side of the diesel oxidation catalyst is a value calculated from both the concentration of $NO_x$ in the exhaust gas on the upstream side of the diesel oxidation catalyst and an air supply flow rate or an exhaust flow rate. Furthermore, the concentration of $NO_x$ in the exhaust gas on the upstream side of the diesel oxidation catalyst is a value obtained by referring for an operating condition of a diesel engine, to a map describing a relationship between the operating condition of the diesel engine, for example, the accelerator opening and rotational speed, and the concentration of $NO_x$ in the exhaust gas on the upstream side of the diesel oxidation catalyst. The above-mentioned proportion of $NO_2$ indicates a ratio, of the amount of nitrogen dioxide ($NO_2$) in the exhaust gas on the downstream side of the selective reduction catalyst to the amount of $NO_x$ in the exhaust gas on the downstream side of the selective reduction catalyst.

The diagnostic apparatus disclosed in Jpn. Pat. Appln. KOKAI Publication No. 2012-36856 calculates the amount of $NO_x$ in the exhaust gas on the upstream side of the diesel oxidation catalyst from an operating condition of the diesel engine and an air supply flow rate or an exhaust flow rate, and computes the proportion of $NO_2$ in the exhaust gas on the downstream side of the selective reduction catalyst by referring a ratio of a detection value output from $NO_x$ sensor to the aforementioned $NO_x$ amount, to a relationship stored in the sensor characteristic storage means. The diagnostic system then evaluates a deterioration degree of the diesel oxidation catalyst based on this proportion of $NO_2$.

Jpn. Pat. Appln. KOKAI Publication No. 2012-219740 discloses that an air-fuel ratio is switched from fuel-lean to fuel-rich, and the decrease in $NO_x$ concentration over time is determined as a $NO_x$ purification rate for exhaust gas that has passed through a catalyst, thereby evaluating the exhaust gas-purifying performance of a catalyst based on this $NO_x$ purification rate.

SUMMARY

The regulations on $NO_x$ emissions are likely to become stricter, and eventually $NO_x$ emissions in actual driving will be regulated. The inventors of the present invention are concerned about the possibility that the technique described above lets $NO_x$ in amount exceeding a reference value be emitted in actual driving.

In view of this, an object of the present invention is to provide an exhaust gas-purifying technique that reduces the possibility that $NO_x$ in amount exceeding a reference value is emitted in actual driving.

According to a first aspect of the present invention, there is provided an exhaust gas-purifying system that purifies exhaust gas emitted by a combustion engine mounted on an automotive vehicle, comprising an exhaust gas-purifying unit that includes one or more exhaust gas-purifying catalysts, is supplied with the exhaust gas from the combustion engine, and purifies the exhaust gas so that the exhaust gas can be released to the atmosphere; a sensor that detects a concentration of nitrogen oxides contained in the exhaust gas purified by the exhaust gas-purifying unit; and a processing section that makes a judgment with respect to at least one of the one or more exhaust gas-purifying catalysts, as to whether or not a performance is maintained at a sufficient level, based on the concentration detected by the sensor.

According to a second aspect of the present invention, there is provided the exhaust gas-purifying system according to the first aspect, wherein if the concentration detected by the sensor is less than a first set value or is less than or equal to the first set value, the processing section makes a judgment with respect to the at least one of the one or more exhaust gas-purifying catalysts, that a performance is maintained at a sufficient level.

According to a second aspect of the present invention, there is provided the exhaust gas-purifying system according to the first or second aspect, wherein the processing section calculates an amount of nitrogen oxides emitted by the automobile vehicle per unit driving distance from the concentration detected by the sensor within a time interval, an amount or a flow rate of air supplied to the combustion engine within the time interval or an amount or a flow rate of the exhaust gas emitted by the combustion engine within the time interval, and a driving distance or a driving velocity of the automotive vehicle within the time interval, and if the calculated amount is less than a second set value or is less than or equal to the second set value, makes a judgment with respect to the at least one of the one or more exhaust gas-purifying catalysts, that a performance is maintained at a sufficient level.

According to a fourth aspect of the present invention, there is provided the exhaust gas-purifying system according to any one of the first to third aspects, wherein the processing section calculates for each of two or more time intervals, an amount of nitrogen oxides emitted by the automobile vehicle per unit driving distance from the concentration detected by the sensor within the time interval, an amount or a flow rate of air supplied to the combustion engine within the time interval or an amount or a flow rate of the exhaust gas emitted by the combustion engine within the time interval, and a driving distance or a driving velocity of the automotive vehicle within the time interval, and estimates a cumulative driving distance at which the amount of nitrogen oxides emitted by the automotive vehicle per unit driving distance reaches a third set value, from a change in the amount of nitrogen oxides emitted by the automotive vehicle per unit driving distance with respect to a cumulative driving distance of the automotive vehicle.

According to a fifth aspect of the present invention, there is provided the exhaust gas-purifying system according to the fourth aspect, wherein if a difference between the estimated cumulative driving distance and an actual cumulative driving distance is less than a fourth set value or is less than or equal to the fourth set value, the processing section makes a judgment with respect to the at least one of the one or more exhaust gas-purifying catalysts that a replacement is necessary or a replacement time is approaching.

According to a sixth aspect of the present invention, there is provided the exhaust gas-purifying system according to any one of the first to fifth aspects, further comprising an output section that outputs a result of processing in the processing section.

According to a seventh aspect of the present invention, there is provided the exhaust gas-purifying system according to any one of the first to sixth aspects, wherein the combustion engine is a diesel engine, and the one or more exhaust gas-purifying catalysts include at least one of a storage and reduction catalyst, a urea selective reduction catalyst, and a hydrocarbon selective reduction catalyst.

According to an eighth aspect of the present invention, there is provided an automotive vehicle comprising the exhaust gas-purifying system according to any one of the first to seventh aspects.

BRIEF DESCRIPTION OF THE DRAWINGS

FIG. 2 is a view schematically showing an example of an exhaust gas-purifying system which can be mounted on the automotive vehicle shown in FIG. 1;

FIG. 4, is a graph showing an example of change over time in the $NO_x$ concentration detected by the sensor included in the exhaust gas-purifying system shown in FIG. 2;

FIG. 5 is a graph showing another example of change over time in the $NO_x$ concentration detected by the sensor included in the exhaust gas-purifying system shown in FIG. 2;

DETAILED DESCRIPTION

Figure 1:
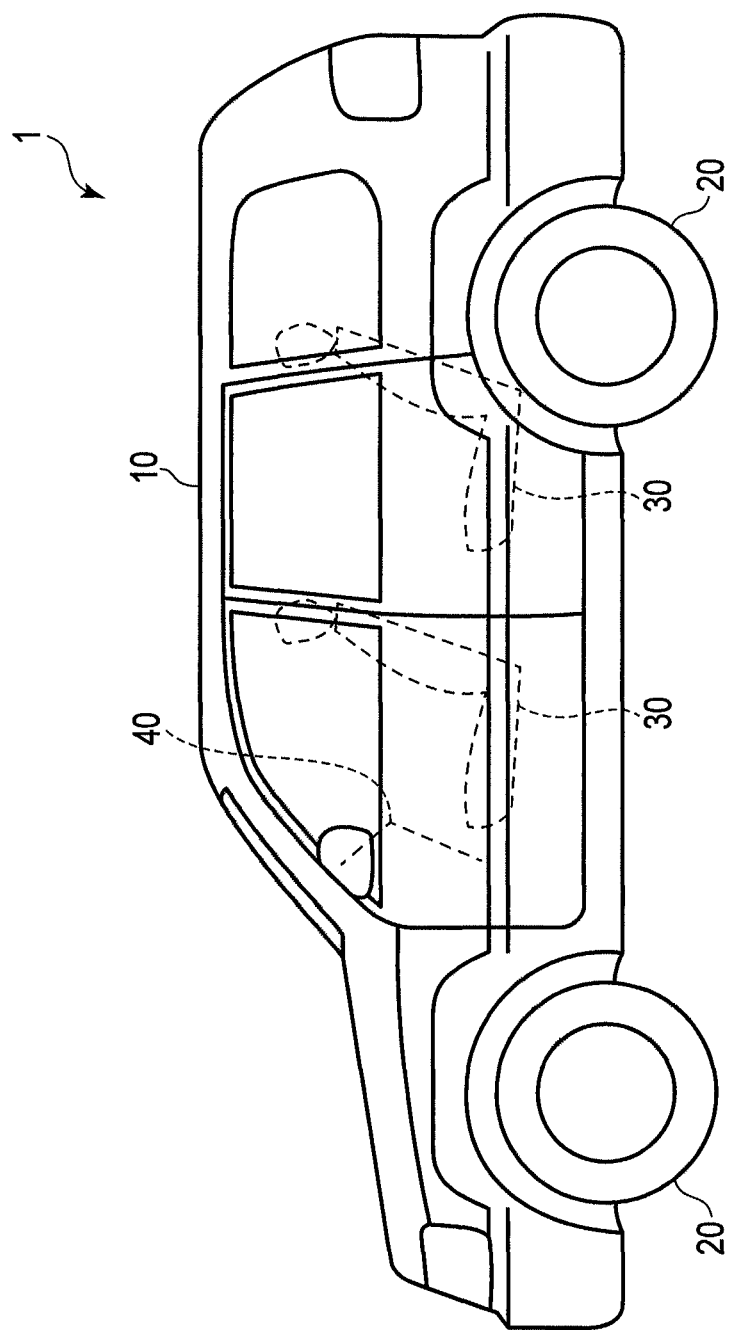
FIG. 1 is a side view schematically showing an automotive vehicle according to an embodiment of the present invention.

Hereinafter, embodiments of the present invention will be described with reference to the drawings. Elements having the same or similar functions are denoted by the same reference numerals, and redundant explanations will be omitted.

FIG. 1 is a side view schematically showing an automotive vehicle according to an embodiment of the present invention. FIG. 2 is a view schematically showing an example of an exhaust gas-purifying system which can be mounted on the automotive vehicle shown in FIG. 1.

FIG. 1 illustrates a four-wheeled vehicle (hereinafter referred to as an automobile) 1 as an example of the automotive vehicle. To facilitate understanding, FIG. 1 and FIG. 2 omit some of the structural elements. In the following description, the terms "front" and "rear" will be used on the basis of a travel direction of the automobile 1, while the terms "upstream" and "downstream" will be used on the basis of a flow of exhaust gas.

The automobile 1 shown in FIG. 1 is a four-wheeled drive vehicle in which a diesel engine 50 shown in FIG. 2 is mounted in front of a passenger room.

The automobile 1 shown in FIG. 1 includes a vehicle body. The vehicle body includes a frame (not shown) and a body 10. The frame and the body 10 may be integrated. That is, the vehicle body may adopt a unibody construction.

The frame is mounted with a drive system, a suspension system, an accelerating system, a brake system, a steering system, etc.

The drive system includes a combustion engine, an air supply system, an exhaust system, a fuel supply system, a power transmission system, etc.

The combustion engine corresponds to the diesel engine 50 shown in FIG. 2, as described above. FIG. 2 illustrates, as structural elements of the diesel engine 50, a cylinder 51, a piston head 52, a connecting rod 53, an intake valve 54, an exhaust valve 55, and a fuel injection nozzle 56 only. Herein, the diesel engine 50 is a four-stroke cycle diesel engine. The diesel engine 50 may be a two-stroke cycle diesel engine.

The air supply system includes an air filter, an air duct, and an air flow meter 60. The air supply system takes in air from the outside of the vehicle, removes dust, etc. from the air with an air filter, and then supplies the air to a combustion chamber of the diesel engine 50 through the air duct. The air flow meter 60 detects a flow rate of air flowing through the air duct. The air supply system may further include a supercharger capable of supplying air increased in pressure to the combustion chamber.

The exhaust system corresponds to an exhaust system 70 shown in FIG. 2. The exhaust system 70 purifies exhaust gas generated through the combustion of fuel, in this case, light oil, in the diesel engine 50, and functions to reduce exhaust note.

The exhaust system 70 includes catalytic converters 71 and 72, a muffler 73, a muffler cutter 74, pipes 75a, 75b, 75c and 75d, and sensors 76a and 76b. The catalytic converters 71 and 72 and the pipe 75b constitute an exhaust gas-purifying unit 70a that purifies exhaust gas so that the exhaust gas can be released to the atmosphere. The muffler 73, the pipe 75d, and the muffler cutter 74 constitute a muffler unit 70b.

The catalytic converter 71 includes a converter body 711, an exhaust gas-purifying catalyst 712, and a diesel particulate filter (DPF) 713.

The converter body 711 is made of, for example, a metal or alloy. The converter body 711 has a hollow structure provided with an inlet port and an outlet port. The inlet port of the converter body 711 is connected to piston chambers of the diesel engine 50 via the pipe 75a and an exhaust manifold (not shown). One end of the pipe 75b is connected to the outlet port of the converter body 711.

The exhaust gas-purifying catalyst 712 is a monolith catalyst of a straight flow type. The exhaust gas-purifying catalyst 712 is contained in the converter body 711 so that the exhaust gas supplied to the inlet port of the converter body 711 passes through through-holes of the exhaust gas-purifying catalyst 712 and is then supplied to the diesel particulate filter 713.

According to an example, the exhaust gas-purifying catalyst 712 is a diesel oxidation catalyst (DOC). According to another example, the exhaust gas-purifying catalyst 712 is a $NO_x$ storage and reduction (NSR) catalyst.

The exhaust gas-purifying catalyst 712 includes a monolith honeycomb substrate and a catalytic layer provided on partition walls of the monolith honeycomb substrate.

The monolith honeycomb substrate is, for example, a column provided with through-holes each extending from one of the bases to the other of the bases. The monolith honeycomb substrate is made of, for example, ceramics such as cordierite and silicon carbide.

The catalytic layer is provided on the partition walls of the monolith honeycomb substrate. The catalytic layer may have a single-layer structure or a multi-layer structure.

When the exhaust gas-purifying catalyst 712 is a diesel oxidation catalyst, the catalytic layer includes, for example, a first carrier and a first precious metal element.

The first carrier is particles made of a refractory material such as alumina. The first carrier carries the first precious metal element. The first carrier increases the surface area of the first precious metal and dissipates the heat generated by the catalytic reaction so as to suppress sintering of the first precious metal.

The first precious metal element is, for example, an element of platinum group such as platinum and palladium. The catalytic layer may include only a single precious metal element or a plurality of precious metal elements as the first precious metal element.

The first precious metal element promotes oxidation of carbon monoxide (CO) and hydrocarbons (HC) in exhaust gas. By the action of the first precious metal element, the concentration of carbon monoxide (CO) and hydrocarbons (HC) in exhaust gas is lowered, and the particulate matter (PM) made of high-boiling hydrocarbons or sulfides is partially removed from the exhaust gas.

When the exhaust gas-purifying catalyst 712 is a $NO_x$ storage and reduction catalyst, the catalytic layer includes, for example, a second carrier, a second precious metal element, and a $NO_x$ storage material.

The second carrier is particles made of a refractory material such as alumina. The second carrier carries the second precious metal element and optionally, the $NO_x$ storage material. The second carrier increases the surface area of the second precious metal and dissipates the heat generated by the catalytic reaction so as to suppress sintering of the second precious metal.

The second precious metal element is, for example, an element of platinum group such as platinum, palladium, and rhodium. The second precious metal element promotes the reduction reaction of $NO_x$ in the exhaust gas. By the action of the second precious metal element, the concentration of $NO_x$ in the exhaust gas is lowered.

The $NO_x$ storage material is, for example, a compound in a form of carbonate or oxide that includes at least one of barium, potassium, lithium, and cerium, or a combination of such compounds. The $NO_x$ storage material stores $NO_x$ under an oxidizing atmosphere and releases $NO_x$ under a reducing atmosphere.

The diesel particulate filter 713 is a monolith catalyst of a wall flow type. The diesel particulate filter 713 is contained in the converter body 711 so that the exhaust gas that has passed through the through-holes of the exhaust gas-purifying catalyst 712 penetrates through the partition walls of the diesel particulate filter 713 and is then emitted from the outlet port of the converter body 711 to the outside of the catalytic converter 71. The diesel particulate filter 713 removes the particulate matter from the exhaust gas.

The diesel particulate filter 713 includes a filter substrate. The filter substrate includes, for example, a honeycomb structure and plugs.

The honeycomb structure is, for example, a column provided with through-holes each extending from one of the bases to the other of the bases. The honeycomb structure includes porous partition walls that constitute side walls of the through-holes, that is, separate the adjacent through-holes. The porous partition walls allow the exhaust gas to pass through without allowing almost all of the particulate matter carried by the exhaust gas to penetrate therethrough.

As a material of the honeycomb structure, for example, ceramics such as cordierite and silicon carbide can be used. A nonwoven fabric made of metal may be incorporated in the honeycomb structure.

Some of the plugs plug some of holes of the honeycomb structure on the downstream side. The plugs that plug holes on the downstream side and the porous partition walls that constitute the side walls of these holes form upstream cells that open on the upstream side.

The remaining plugs plug the remaining holes of the honeycomb structure on the upstream side. The plugs that plug holes on the upstream side and the porous partition walls that constitute the side walls of these holes form downstream cells that open on the downstream side.

These plugs are disposed in a manner such that a hole whose downstream side is plugged with a plug and a hole whose upstream side is plugged with a plug are adjacent to each other with the porous partition wall interposed therebetween. That is, the upstream cells and the downstream cells are adjacent to each other with the porous partition wall interposed therebetween.

As a material of the plugs, for example, ceramics such as cordierite and silicon carbide can be used.

The exhaust gas that has passed through the through-holes of the exhaust gas-purifying catalyst 712 first flows into the upstream cells of the diesel particulate filter 713. Then, the exhaust gas penetrates through the porous partition walls separating the upstream cells and the downstream cells, thereby flowing into the downstream cells. At this time, the particulate matter is removed from the exhaust gas.

In addition to the function as a filter, the diesel particulate filter 713 may further have other functions. That is, the diesel particulate filter 713 may further include a catalytic layer provided on the honeycomb structure and/or the plugs.

For example, the diesel particulate filter 713 may have, in addition to the function as a filter, a function as a selective catalytic reduction (SCR) catalyst, for example, a function of promoting the reduction of $NO_x$ to nitrogen by the reaction with hydrocarbons or ammonia. That is, the diesel particulate filter 713 may further have a function as a urea selective reduction catalyst or a hydrocarbon selective reduction catalyst.

When the diesel particulate filter 713 is given a function as a urea selective reduction catalyst, for example, its catalytic layer can include, as an active component, zeolite in which alkali metal ions such as sodium ions and potassium ions are partially exchanged with transition metal ions such as iron ions and copper ions. Alternatively, as such an active component, oxides of base metals such as tungsten and vanadium can also be used.

When the diesel particulate filter 713 is given a function as a urea selective reduction catalyst, the exhaust system 70 is further provided with a first injector that injects an aqueous urea solution into exhaust gas on the upstream side with respect to the diesel particulate filter 713.

As described above, one end of the pipe 75b is connected to the outlet port of the converter body 711. A sensor 76a is installed on the pipe 75b. The sensor 76a detects the concentration of $NO_x$ in the exhaust gas emitted by the catalytic converter 71. For example, output of the sensor 76a is used to control the injection amount of ammonia or its precursor, e.g., urea aqueous solution, into the exhaust gas.

The catalytic converter 72 includes a converter body 721 and an exhaust gas-purifying catalyst 722.

The converter body 721 is made of, for example, metal or alloy. The converter body 721 has a hollow structure provided with an inlet port and an outlet port. An inlet port of the converter body 711 is connected to an outlet port of the converter body 711 via the pipe 75b. One end of the pipe 75c is connected to the outlet port of the converter body 721.

The exhaust gas-purifying catalyst 722 is a monolith catalyst of a straight flow type. The exhaust gas-purifying catalyst 722 is contained in the converter body 721 so that the exhaust gas supplied to the inlet port of the converter body 721 passes through through-holes of the exhaust gas purifying catalyst 722 and is then emitted from the outlet port of the converter body 721 to the outside of catalytic converter 72.

According to an example, the exhaust gas-purifying catalyst 722 has a function as a selective reduction catalyst and a function as an ammonia slip catalyst (ASC).

The exhaust gas-purifying catalyst 722 includes a monolith honeycomb substrate and a catalytic layer provided on partition walls of the monolith honeycomb substrate.

The monolith honeycomb substrate is, for example, a column provided with through-holes each extending from one of the bases to the other of the bases. The monolith honeycomb substrate is made of, for example, ceramics such as cordierite and silicon carbide.

The catalytic layer is provided on the partition walls of the monolith honeycomb substrate. The catalytic layer may have a single-layer structure or a multi-layer structure.

When the exhaust gas-purifying catalyst 712 has a function as a selective reduction catalyst and a function as an ammonia slip catalyst, the catalytic layer may adopt, for example, a structure including a first layer and a second layer, in which the first layer is located on the partition walls of an upstream part of the substrate and has a function as a selective reduction catalyst, and the second layer is located on the partition walls of a downstream part of the substrate and has a function as an ammonia slip catalyst. Alternatively, in this case, the catalytic layer may adopt a multilayer structure including a first layer that has a function as a selective reduction catalyst, and a second layer that is interposed between the first layer and the partition walls of the substrate and has a function as an ammonia slip catalyst.

As an active component of the first layer having a function as a selective reduction catalyst, for example, zeolite in which alkali metal ions such as sodium ions and potassium ions are partially exchanged with transition metal ions such as iron ions and copper ions can be used. Alternatively, as such an active component, oxides of base metals such as tungsten and vanadium can also be used.

The ammonia slip catalyst is an oxidation catalyst and promotes oxidation of unreacted ammonia. Although oxidation of ammonia produces nitrogen oxides, the amount of nitrogen oxides produced in the ammonia slip catalyst is small because the amount of the unreacted ammonia is small, too. Thus, the ammonia slip catalyst decreases the concentration of ammonia in the exhaust gas without causing a significant increase in the concentration of nitrogen oxides in the exhaust gas.

The second layer having a function as an ammonia slip catalyst contains, for example, a third carrier and a third precious metal element.

The third carrier is particles made of a refractory material such as alumina. The third carrier carries the third precious metal element. The third carrier increases the surface area of the third precious metal and dissipates the heat generated by the catalytic reaction so as to suppress sintering of the third precious metal.

The third precious metal element is, for example, an element of platinum group such as platinum and palladium. The third precious metal element promotes oxidation of ammonia. The second layer may include only a single precious metal element or a plurality of precious metal elements as the third precious metal element. As the second precious metal element, for example, the second layer may include only platinum, or both platinum and palladium.

Assume that the exhaust gas-purifying catalyst 722 has both a function as a selective reduction catalyst and a function as an ammonia slip catalyst. In this case, when the diesel particulate filter 713 is not given a function as a selective reduction catalyst, the exhaust system 70 is, for example, not provided with the first injector but is provided with only a second injector that injects ammonia or its precursor, e.g., urea aqueous solution, into the exhaust gas at a position between the diesel particulate filter 713 and the exhaust gas-purifying catalyst 722.

Also, when the diesel particulate filter 713 is given a function as a selective reduction catalyst, for example, part of the ammonia or its precursor injected into the exhaust gas by the first injector may not be entirely consumed in the catalytic converter 71 and may be supplied to the catalytic converter 72. Accordingly, in the case where the exhaust gas-purifying catalyst 722 has both a function as a selective reduction catalyst and a function as an ammonia slip catalyst and the diesel particulate filter 713 is given a function as a selective reduction catalyst, the exhaust system 70 may or may not be provided with the second injector described above.

As described above, one end of the pipe 75c is connected to the outlet port of the converter body 721. The sensor 76b is installed on the pipe 75c. The sensor 76b detects the concentration of $NO_x$ in the exhaust gas emitted by the catalytic converter 72. Output of the sensor 76b is used, for example, to make a judgment with respect to at least one of exhaust gas-purifying catalysts included in the exhaust gas-purifying unit 70a as to whether or not the performance is maintained at a sufficient level. Output of the sensor 76b can also be used to control the injection amount of ammonia or its precursor, e.g., urea aqueous solution, into the exhaust gas.

The muffler 73 is made of, for example, a metal or alloy. The muffler 73 is provided with an inlet port and an outlet port, and has a hollow structure whose inside is divided into a plurality of chambers. The muffler 73 functions to reduce exhaust note. The inlet port of the muffler 73 is connected to the outlet port of the converter body via the pipe 75c. One end of the pipe 75d is connected to the outlet port of the muffler 73.

The muffler cutter 74 is made of, for example, a metal or alloy. The muffler cutter 74 has a hollow structure provided with an inlet port and an outlet port. The inlet port of the muffler cutter 74 is connected to the other end of the pipe 75d. The muffler cutter 74 can be omitted.

The fuel supply system includes a fuel tank, a fuel injection pump, and a fuel pipe. The fuel supply system operates the fuel injection pump, thereby sending light oil contained in the fuel tank to the fuel injection nozzle 56 via the fuel pipe. The automobile 1 shown in FIG. 1 controls the operation of the fuel injection pump, thereby adjusting the output of the diesel engine 50 shown in FIG. 2.

The power transmission system includes a transmission, a drive shaft, a differential, and axles. The power transmission system transmits, for example, rotational motion of the diesel engine 50 to the axles via the transmission, the drive shaft, and the differential.

The suspension system includes suspensions, wheels, and tires 20 shown in FIG. 1. The suspensions are fixed to the frame and rotatably support axles for front and rear wheels. The wheels are connected to the axles and support the tires 20 inside them.

The accelerating system includes an accelerator pedal. The accelerating system changes the amount of light oil injected by the fuel injection nozzle 56 shown in FIG. 2 in accordance with, for example, the displacement of the accelerator pedal.

The brake system includes a brake pedal and brake bodies. The brake bodies are, for example, disc brakes each including a brake caliper attached to the suspension and a brake disc attached to the axle. The brake system changes braking force of the brake bodies in accordance with, for example, the displacement of the brake pedal.

The steering system includes a steering wheel, a steering arm, a steering gear, a pitman arm, and a tie rod. The steering system changes the direction of the front wheels according to the rotation angle of the steering.

The vehicle body further includes a control section 80 shown in FIG. 2. The control section 80 makes a judgment with respect to at least one of exhaust gas-purifying catalysts as to whether or not the performance is maintained at a sufficient level, based on the concentration of $NO_x$ in the exhaust gas detected by the sensor 76b.

The control section 80 includes a processing section 810 and a storage section 820. The control section 80, together with the exhaust gas purifying unit 70a, constitutes an exhaust gas-purifying system.

The processing section 810 includes a central processing unit (CPU).

The processing section 810 is connected to the sensors 76a and 76b and the injector described above. The processing section 810 controls the operation of the injector based on the concentration of $NO_x$ in the exhaust gas detected by the sensors 76a and 76b.

The processing section 810 is further connected to the air flow meter 60, the storage section 820, and the speedometer 90 and the display section 100, which will be described later. Instead of connecting the speedometer 90, a distance meter may be connected to the processing section 810. Alternatively, the processing section 810 may be connected to a sensor connected to the speedometer 90 or the distance meter.

The processing section 810 makes a judgment with respect to at least one of exhaust gas purifying-catalysts as to whether or not the performance is maintained at a sufficient level, based on the outputs of the sensor 76b, the air flow meter 60, and the speedometer 90. Then, the processing section 810 outputs the result of this judgment to the display section 100. The operation of the processing section 810 will be described in detail later.

The storage section 820 is connected to the processing section 810. The storage section 820 includes a nonvolatile memory that stores a program read by the processing section 810 and data supplied from the processing section 810.

The vehicle body further includes seats 30 and a dashboard 40 shown in FIG. 1. The dashboard 40 separates an engine room in which the diesel engine 50, the air supply system, etc., are arranged, and a passenger room in which the seats 30 are arranged. On the dashboard 40, a speed indicator, a warning light, etc., are installed.

Furthermore, the display section 100 shown in FIG. 2 is installed on the dashboard 40. The display section 100 is an example of an output section that outputs a result of judgment made by the processing section 810 regarding the performance of an exhaust gas-purifying catalyst. The display section 100 displays a result of judgment made by the processing section 810 regarding the performance of an exhaust gas-purifying catalyst so that, for example, a driver or a mechanic or inspector can perceive the result. The display section 100 may be installed at a position other than the dashboard 40.

The display section 100 is, for example, a direct view display, a projection display such as a head-up display, a warning light, or a combination of them. As the display section 100, for example, a liquid crystal display, an organic electroluminescent display, a light-emitting diode, or a combination of them can be used.

The display section 100 can be omitted.

For example, in the case where the control section 80 is provided with a communication section that enables wired or wireless communications, a result of judgment made by the processing section 810 regarding the performance of an exhaust gas purifying catalyst may be displayed on a device such as a smart phone through communications between this device and the control section 80. In this case, the communication section corresponds to the aforementioned output section.

Alternatively, instead of adopting a configuration in which a driver or a mechanic or inspector is notified, through display, of a result of judgment made by the processing section 810 regarding the performance of an exhaust gas-purifying catalyst, a configuration in which such a person is notified of such a result through warning sound such as buzzer, voice guidance, etc., may be adopted. In this case, a buzzer or a voice guidance device corresponds to the aforementioned output section.

Next, the operation of the automobile 1 shown in FIG. 1, in particular, control performed by the exhaust gas-purifying system shown in FIG. 2 will be described with reference to FIGS. 1 to 11.

Figure 3:
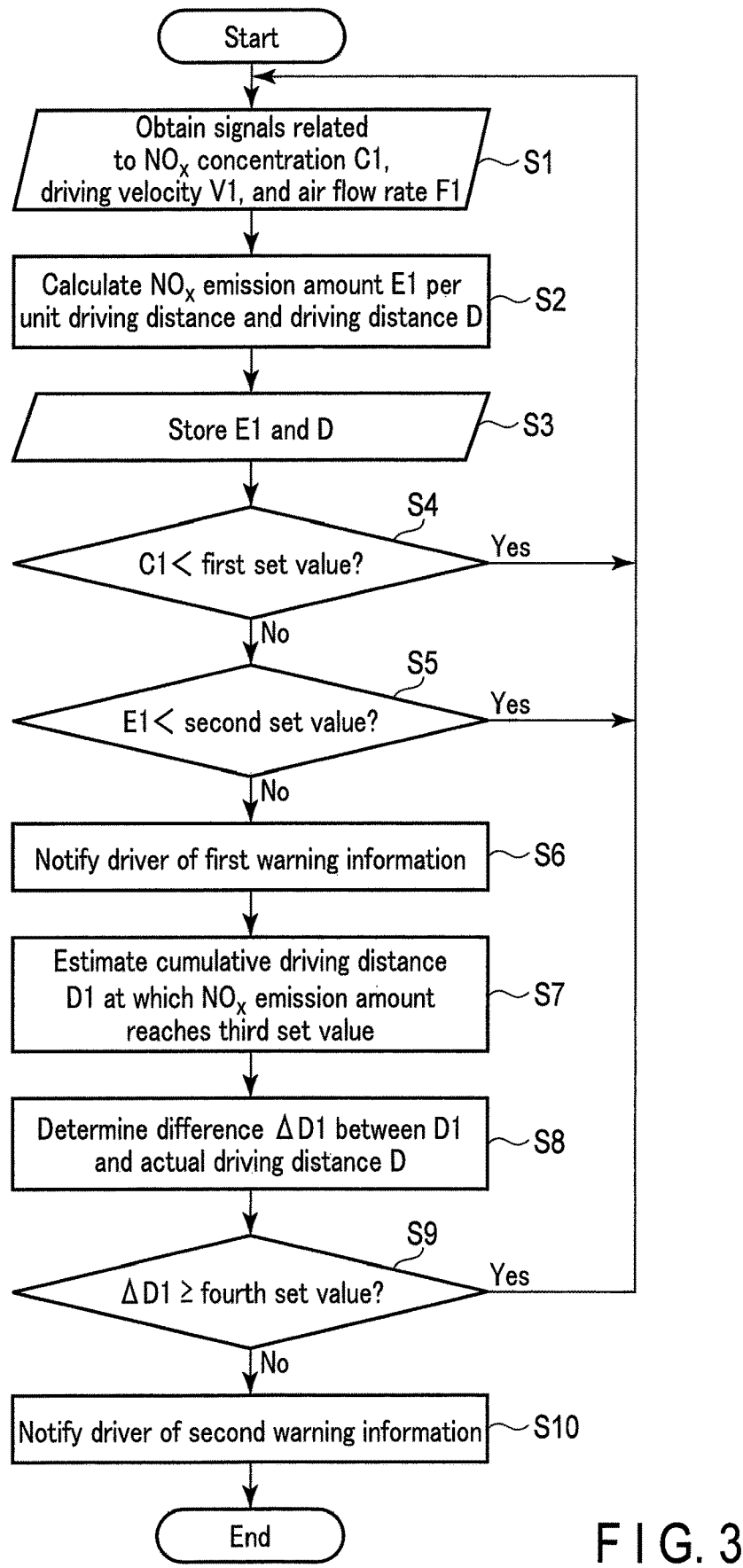
FIG. 3 is a flowchart showing an example of control performed by the exhaust gas-purifying system shown in FIG. 2.
Figure 6:
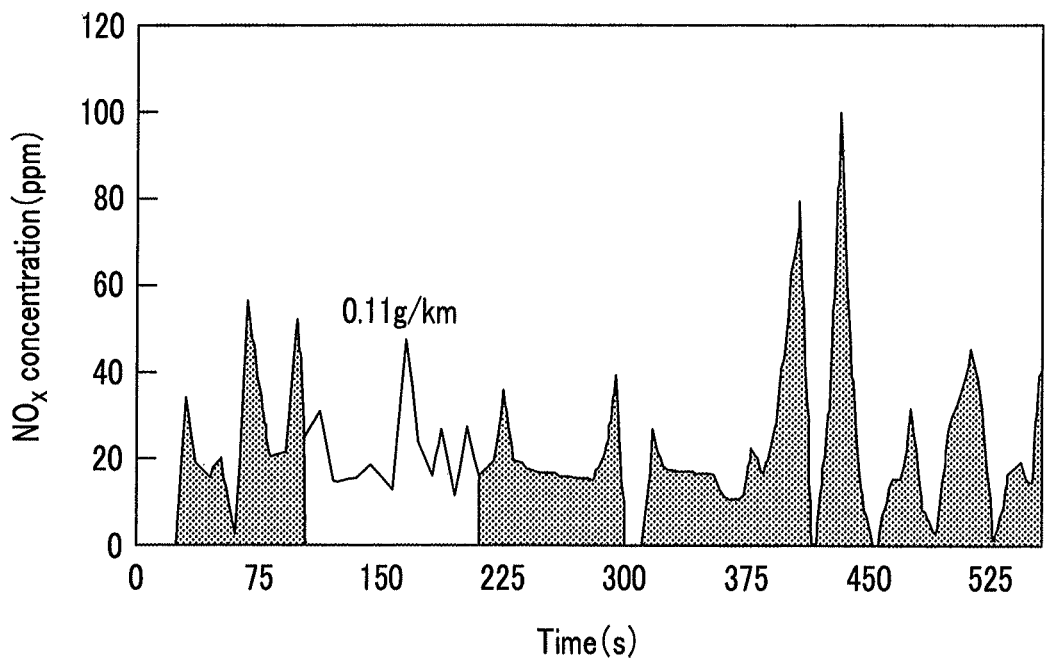
FIG. 6 is a graph showing an example of the $NO_x$ emission amount per unit driving distance.
Figure 7:
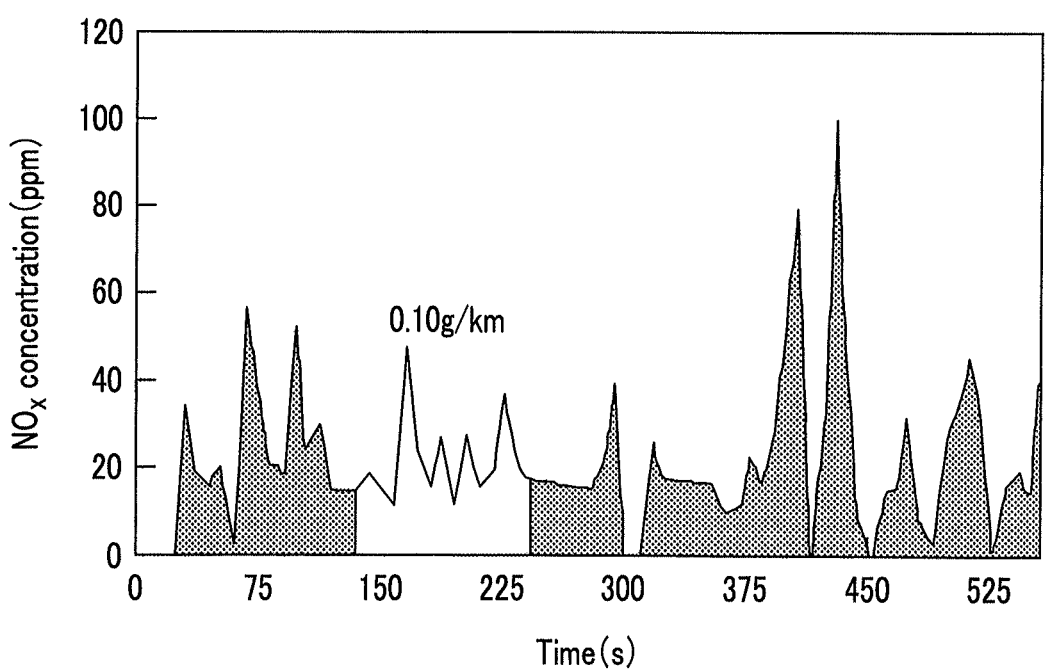
FIG. 7 is a graph showing another example of the $NO_x$ emission amount per unit driving distance.
Figure 8:
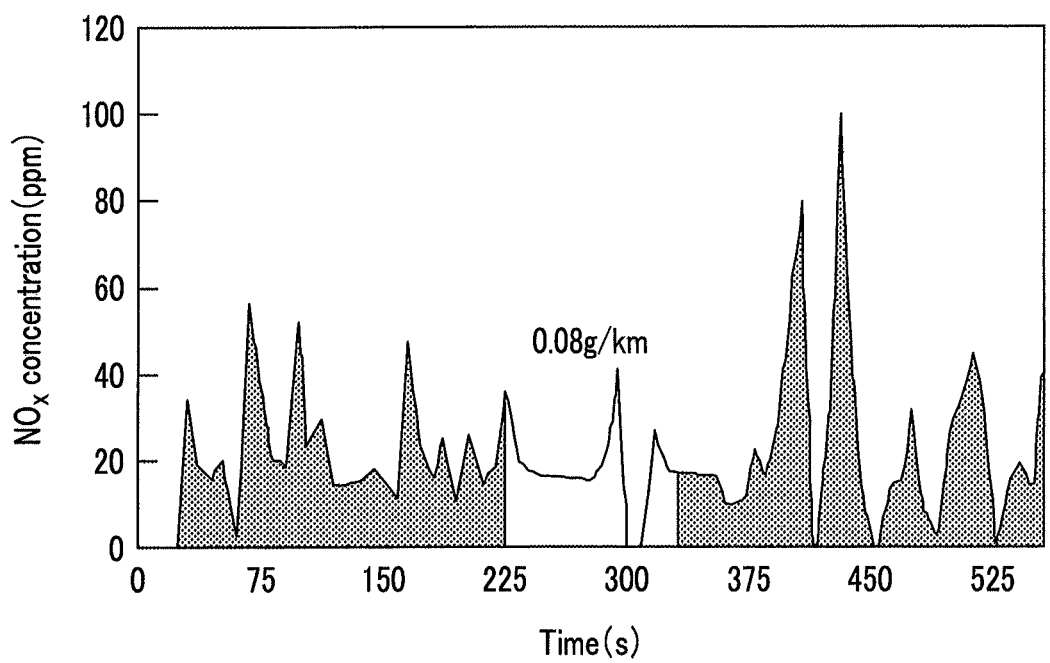
FIG. 8 is a graph showing yet another example of the $NO_x$ emission amount per unit driving distance.
Figure 9:
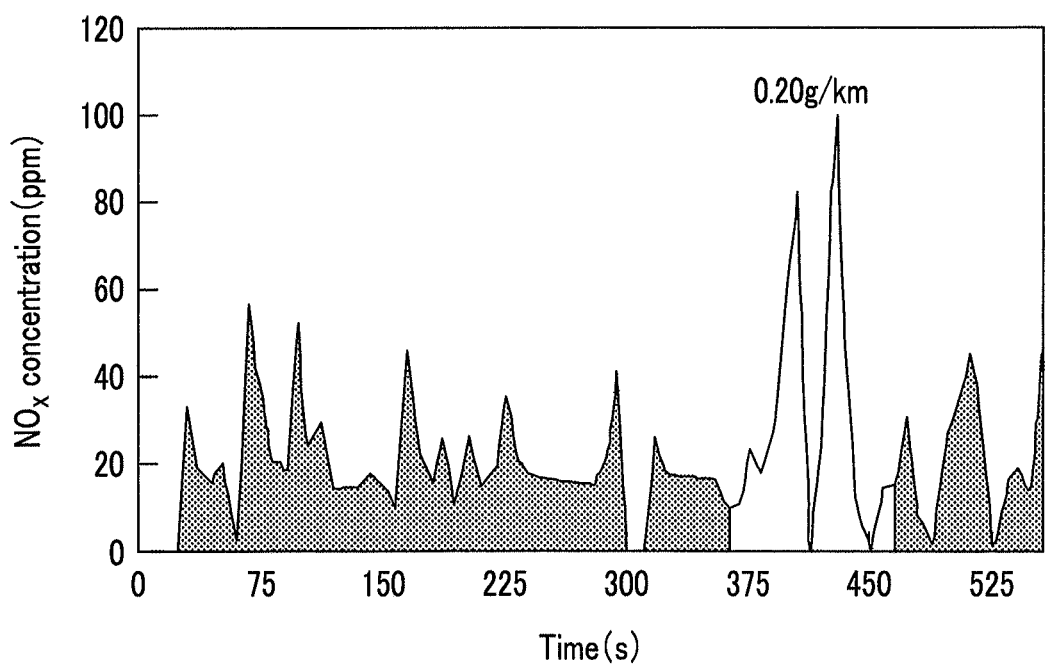
FIG. 9 is a graph showing yet another example of the $NO_x$ emission amount per unit driving distance.
Figure 10:
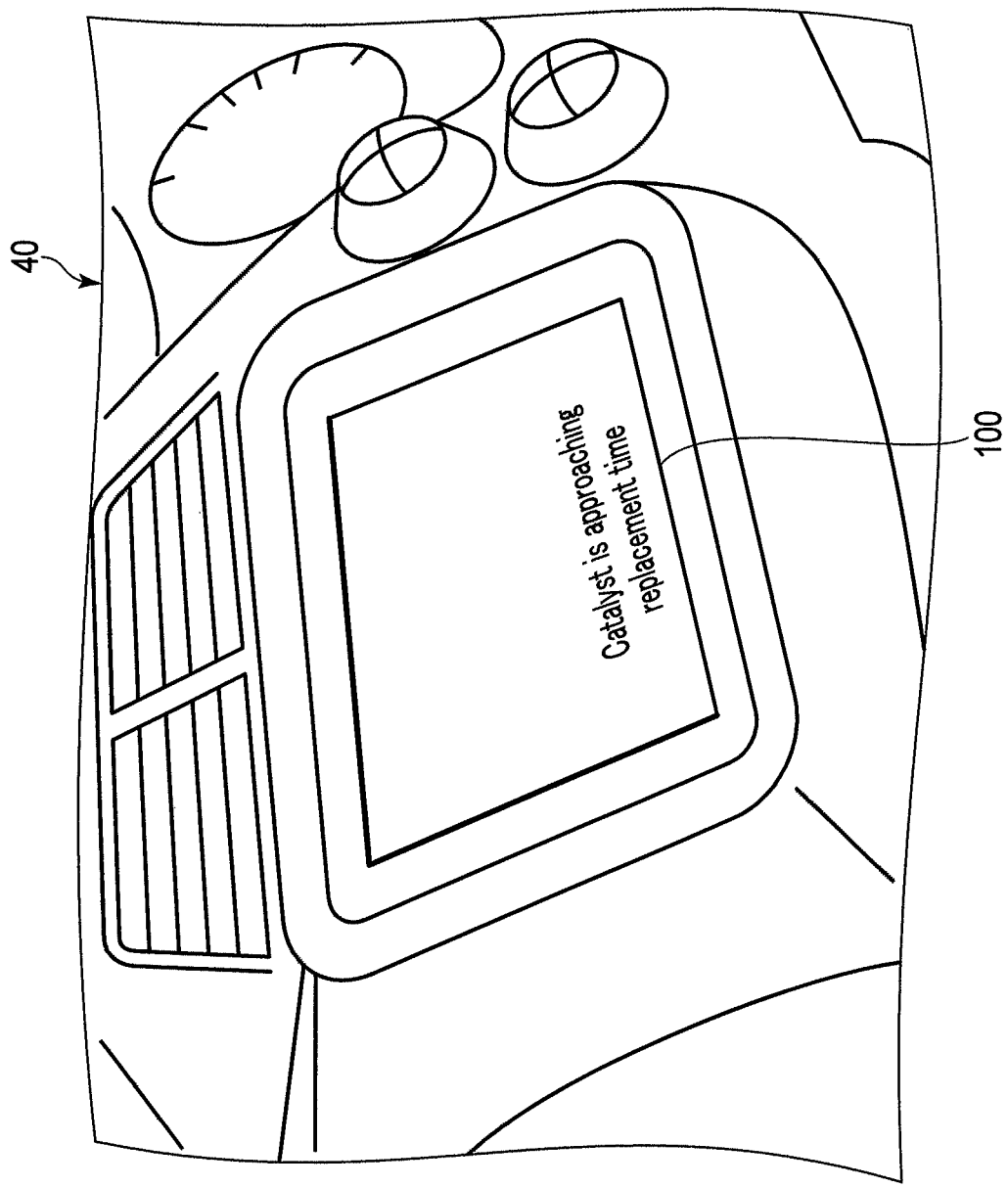
FIG. 10 is a perspective view schematically showing a state in which the exhaust gas-purifying system shown in FIG. 2 warns a driver that a time to replace a catalyst is approaching.
Figure 11:
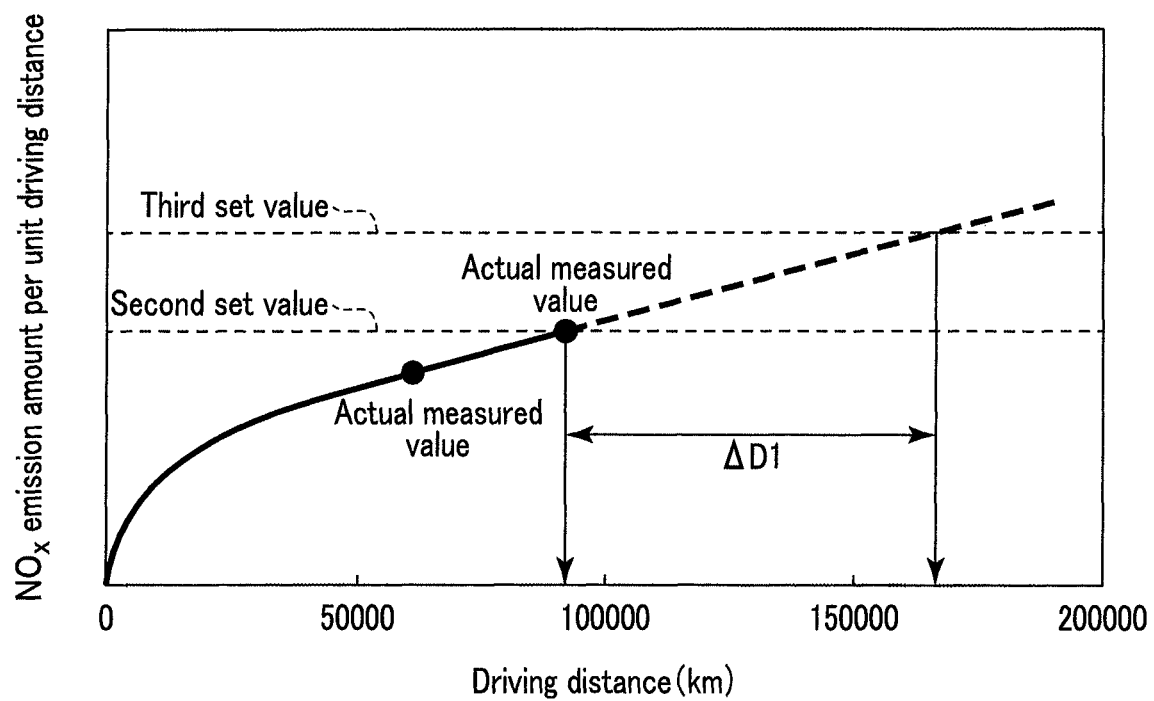
FIG. 11 is a graph for illustrating a method of estimating based on the $NO_x$ emission amount, a cumulative driving distance at which the amount of nitrogen oxides emitted by an automotive vehicle per unit driving distance reaches the third set value.

FIG. 3 is a flowchart showing an example of control performed by the exhaust gas-purifying system shown in FIG. 2. FIG. 4 is a graph showing an example of change over time in the $NO_x$ concentration detected by the sensor included in the exhaust gas-purifying system shown in FIG. 2. FIG. 5 is a graph showing another example of change over time in the $NO_x$ concentration detected by the sensor included in the exhaust gas-purifying system shown in FIG. 2. FIG. 6 is a graph showing an example of the $NO_x$ emission amount per unit driving distance. FIG. 7 is a graph showing another example of the $NO_x$ emission amount per unit driving distance. FIG. 8 is a graph showing yet another example of the $NO_x$ emission amount per unit driving distance. FIG. 9 is a graph showing yet another example of the $NO_x$ emission amount per unit driving distance. FIG. 10 is a perspective view schematically showing a state in which the exhaust gas-purifying system shown in FIG. 2 warns a driver that a time to replace a catalyst is approaching. FIG. 11 is a graph for illustrating a method of estimating based on the $NO_x$ emission amount, a cumulative driving distance at which the amount of nitrogen oxides emitted by an automotive vehicle per unit driving distance reaches the third set value.

An increase in cumulative driving distance of the automobile 1 shown in FIG. 1 involves change in performance of at least one of exhaust gas-purifying catalysts included in the exhaust gas purifying unit 70a shown in FIG. 2. A significant decrease in performance of the exhaust gas-purifying unit 70a generates a possibility that $NO_x$ in amount exceeding a regulation value is emitted. If the control shown in FIG. 3 is performed, such a possibility can be reduced.

Under the control shown in FIG. 3, the first to fourth set values are stored in advance in the storage section 820 shown in FIG. 2. In this respect, the first set value is a threshold related to the concentration of $NO_x$ in the exhaust gas just before it is released to the atmosphere. The second set value is a threshold related to the $NO_x$ emission amount per unit driving distance. Herein, as an example, the first set value is 200 ppm, while the second set value is greater than 0.11 g/km and less than 0.20 g/km. Furthermore, the third set value is a threshold related to the $NO_x$ emission amount per unit driving distance, and is a value less than the second set value. The fourth set value is a threshold related to a difference $\Delta D1$ between a cumulative driving distance D1 at which the $NO_x$ emission amount reaches the third set value and an actual cumulative driving distance D.

As described above, the sensor 76b, the speedometer 90, and the air flow meter 60 are connected to the processing section 810 shown in FIG. 2. The sensor 76b detects a $NO_x$ concentration C1 in the exhaust gas. The speedometer 90 measures a driving velocity V1 of the automobile 1 shown in FIG. 1. The air flow meter 60 detects a flow rate F1 of the air flowing into the diesel engine 50. The processing section 810 shown in FIG. 2 obtains signals related to the $NO_x$ concentration C1, the driving velocity V1, and the air flow rate F1, from the sensor 76b, the speedometer 90, and the air flow meter 60, respectively (step S1 in FIG. 3).

The processing section 810 calculates an amount E1 of $NO_x$ emitted by the automobile 1 per unit driving distance, from: the $NO_x$ concentration C1 detected by the sensor 76b between time t1 and time t2, that is, within a time interval $\Delta t$ (=t2−t1); the amount or the flow rate F1 of air supplied to the diesel engine 50 within this time interval $\Delta t$ or the amount or the flow rate of exhaust gas emitted by the diesel engine 50 within this time interval $\Delta t$; and a driving distance $\Delta D$ or the driving velocity V1 of the automobile 1 within this time interval $\Delta t$.

Furthermore, the processing section 810 calculates a driving distance D at time t2, from the driving distance $\Delta D$ or the driving velocity V1 of the automobile 1 within the aforementioned time interval $\Delta t$ and a past driving distance D0 stored in the storage section 820.

For example, the processing section 810 calculates the $NO_x$ emission amount E1 per unit driving distance and the driving distance D from signals corresponding to the $NO_x$ concentration C1, the driving velocity, and the air flow rate F1 (step S2 in FIG. 3). The storage section 820 stores the $NO_x$ emission amount E1 and the driving distance D (step S3 in FIG. 3).

The $NO_x$ emission amount E1 per unit driving distance is calculated, for example, using the following equation.

$$E1 = \int_{t1}^{t2} \frac{\frac{F1}{28.89} \times C1 \times M_{NOx}}{V1} dt$$

In the above, "t1" and "t2" represent time. The difference (time interval $\Delta t$) between the time t2 and the time t1 corresponds to a fixed time or a time required to drive a fixed distance. Herein, as an example, the difference between time t2 and time t1 is fixed.

Furthermore, "$M_{NOx}$" is an average molecular weight of $NO_x$, and is a constant in this example. For example, in the case of $NO_x$ being a mixture that contains nitrogen oxide (NO) having a molecular weight of 30 and nitrogen dioxide ($NO_2$) having a molecular weight of 46 in a molar ratio of 1:1, the average molecular weight of $NO_x$ is 38.

In the above equation, the $NO_x$ concentration C1 corresponds to a volume concentration (volume/volume). Furthermore, the units of the $NO_x$ emission amount E1, the driving velocity V1, and the air flow rate F1 are "g/km", "km/sec", and "g/sec", respectively.

Next, the processing section 810 compares the $NO_x$ concentration C1 with the first set value (step S4 in FIG. 3). As shown in FIG. 4, in the case where the $NO_x$ concentration C1 is less than the first set value or is less than or equal to the first set value, the processing section 810 makes a judgment with respect to the exhaust gas-purifying unit 70a, in particular, at least one, for example, all of the exhaust gas-purifying catalysts 712 and 722 and the diesel particulate filter 713, that the performance is maintained at a sufficient level. In this case, the control section 80 repeats the sequence including steps S1 to S4 shown in FIG. 3.

As shown in FIG. 5, when the $NO_x$ concentration C1 is greater than or equal to the first set value or exceeds the first set value, the processing section 810 compares the $NO_x$ emission amount E1 with the second set value (step S5 shown in FIG. 3). As shown in FIGS. 6 to 8, when the $NO_x$ emission amount E1 is less than the second set value or is less than or equal to the second set value, the processing section 810 makes a judgment with respect to the exhaust gas-purifying unit 70a, in particular, at least one, for example, all of the exhaust gas-purifying catalysts 712 and 722 and the diesel particulate filter 713, that the performance is maintained at a sufficient level. In this case, the controlling section 80 repeats the sequence including step S1 and the subsequent steps shown in FIG. 3.

As shown in FIG. 9, when the $NO_x$ emission amount E1 is greater than or equal to the second set value or exceeds the second set value, the controlling section 80 outputs a video signal corresponding to the first warning information to the display section 100. The display section 100 notifies a driver of the first warning information, for example, by displaying it as a character string, such as shown in FIG. 10 (step S6 in FIG. 3). The display section 100 may display the first warning information in a form other than characters, such as a mark.

Next, the processing section 810 estimates the cumulative driving distance D1 at which the $NO_x$ emission amount E1 reaches the third set value (step S7 in FIG. 3).

For example, the processing section 810 calculates the amount of nitrogen oxides emitted by the automobile per unit driving distance for each of two or more time intervals $\Delta t$ from: the $NO_x$ concentration C1 detected by the sensor 76b within the time interval $\Delta t$; the amount or the flow rate F1 of air supplied to the diesel engine 50 within the time interval $\Delta t$ or the amount or the flow rate of exhaust gas emitted by the diesel engine 50 within the time interval $\Delta t$; and the driving distance or the driving velocity V1 of the automobile 1 within the time interval $\Delta t$. The processing section 810 estimates the cumulative driving distance D1 at which the amount E1 of $NO_x$ emitted by the automobile 1 per unit driving distance reaches the third set value, from the change in the amount E1 of nitrogen oxides emitted by the automobile 1 per unit driving distance with respect to the cumulative driving distance D of the automobile 1.

According to an example, the processing section 810 determines a relationship between the $NO_x$ emission amount E1 and the driving distance D from two or more sets of data already stored in the storage section 820, in which each of the sets includes the $NO_x$ emission amount E1 and the driving distance D, as shown in FIG. 11. The processing section 810 then estimates by extrapolation the cumulative driving distance D1 at which the $NO_x$ emission amount E1 reaches the third set value.

Next, the processing section 810 calculates the difference $\Delta D1$ between the estimated cumulative driving distance D1 and the actual cumulative driving distance D (step S8 in FIG. 3).

The processing section 810 then compares the difference $\Delta D1$ with a fourth set value (step S9 in FIG. 3). If the difference $\Delta D1$ is greater than or equal to the fourth set value or exceeds the fourth set value, the controlling section 80 repeats the sequence including step S1 and the subsequent steps shown in FIG. 3.

If the difference $\Delta D1$ is less than the fourth set value or is less than or equal to the fourth set value, the controlling section 80 makes a judgment with respect to the components included in the exhaust gas-purifying unit 70a, in particular, at least one of the exhaust gas-purifying catalysts 712 and 722 and the diesel particulate filter 713, that the replacement is necessary or the replacement time is approaching. In this case, the controlling section 80 outputs a video signal corresponding to the second warning information to the display section 100. The display section 100 notifies a driver of the second warning information by displaying it (step S10 in FIG. 3).

The first warning information and the second warning information may be identical or different. If the first warning information and the second warning information are identical, for example, the first warning information is continuously displayed and the second warning information is displayed in a blinking manner so that the first warning information and the second warning information can be distinguished from each other.

In the automobile 1 described above, the sensor 76b detects the concentration C1 of $NO_x$ contained in the exhaust gas purified by the exhaust gas-purifying unit 70a that purifies exhaust gas so that the exhaust gas can be released to the atmosphere. That is, the measurement of the $NO_x$ concentration C1 is performed on the exhaust gas having passed through the last exhaust gas-purifying catalyst. Based on this $NO_x$ concentration C1, the processing section 80 makes a judgment with respect to at least one of the exhaust gas-purifying catalysts 712 and 722 and the diesel particulate filter 713, as to whether or not the performance is maintained at a sufficient level. Therefore, there is a low possibility that the $NO_x$ in amount exceeding a reference value is emitted in actual driving of this automobile 1.

In this automobile 1, the amount E1 of $NO_x$ emitted by the automobile 1 per unit driving distance is calculated from the $NO_x$ concentration C1, the air flow rate F1, and the driving velocity V1. In this automobile 1, furthermore, the $NO_x$ emission amount E1 is compared with the second set value to make a judgment with respect to at least one of the exhaust gas-purifying catalysts 712 and 722 and the diesel particulate filter 713, as to whether the performance is maintained at a sufficient level. Therefore, there is a lower possibility that the $NO_x$ in amount exceeding a reference value is emitted in actual driving of the automobile 1.

This automobile 1 estimates the cumulative driving distance D1 at which the $NO_x$ emission amount E1 reaches the third set value, compares the difference $\Delta D1$ between the estimated cumulative driving distance D1 and the actual cumulative driving distance D with the fourth set value, and makes a judgment with respect to at least one of the exhaust gas-purifying catalysts 712 and 722 and the diesel particulate filter 713, as to whether the replacement is necessary or the replacement time is approaching. Therefore, there is an even lower possibility that the $NO_x$ in amount exceeding a reference value is emitted in actual driving of the automobile 1.

In addition, as a result of the comparison between the $NO_x$ emission amount E1 and the second set value, if a judgment that the performance is maintained at a sufficient level is not made with respect to at least one of the exhaust gas-purifying catalysts 712 and 722 and the diesel particulate filter 713, the automobile 1 notifies a driver, etc., of the first warning information. Furthermore, as a result of the comparison between the difference ΔD1 and the fourth set value, if a judgment that the replacement is necessary or the replacement time is approaching is made with respect to at least one of the exhaust gas-purifying catalysts 712 and 722 and the diesel particulate filter 713, the automobile 1 notifies a driver, etc., of the second warning information. Accordingly, a driver, etc., can be aware in advance of the replacement time of the exhaust gas-purifying catalysts, etc., thereby reducing the possibility of missing the replacement time.

The exhaust gas-purifying system shown in FIG. 2 may perform control to be described below, instead of the control described with reference to FIG. 3.

Figure 12:
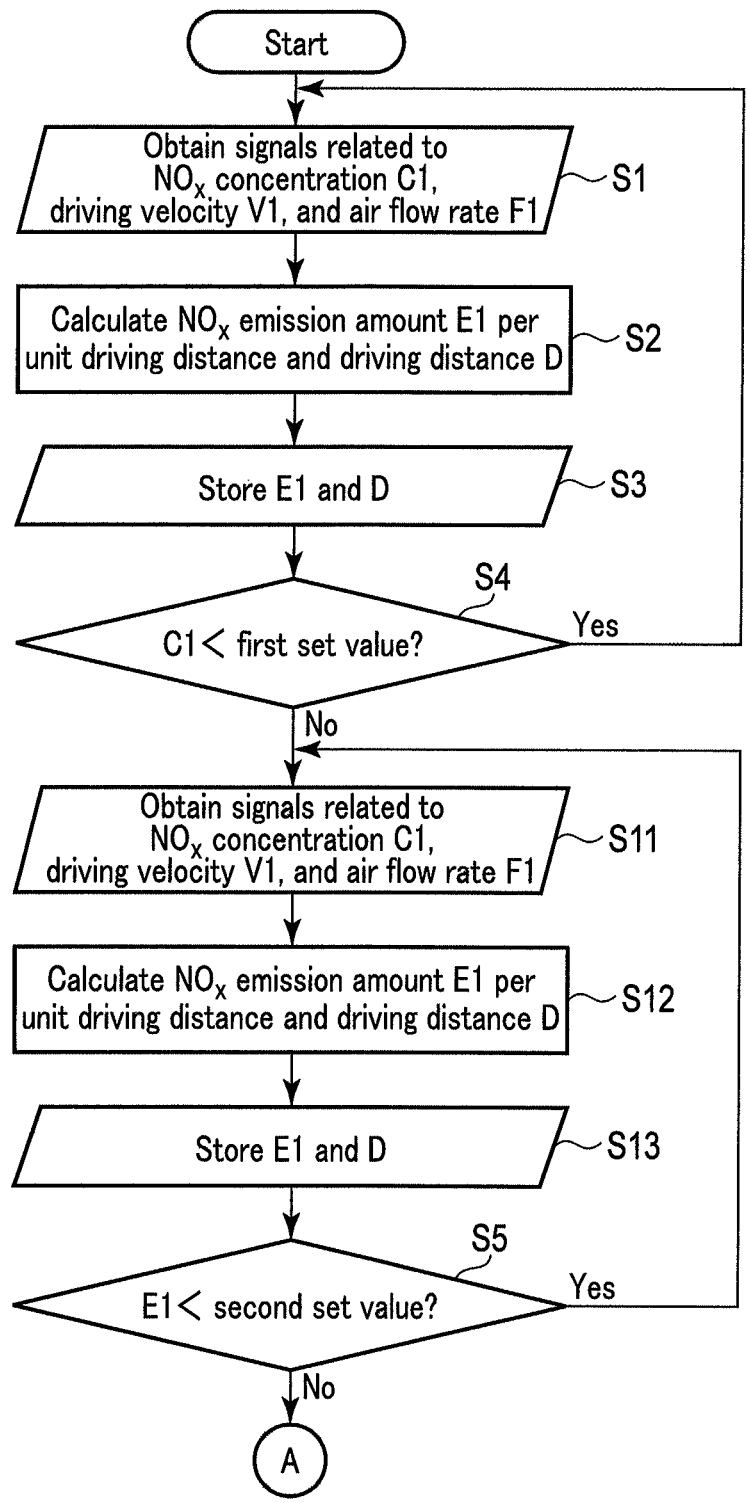
FIG. 12 is a flowchart showing a part of another example of control performed by the exhaust gas-purifying system shown in FIG. 2.
Figure 13:
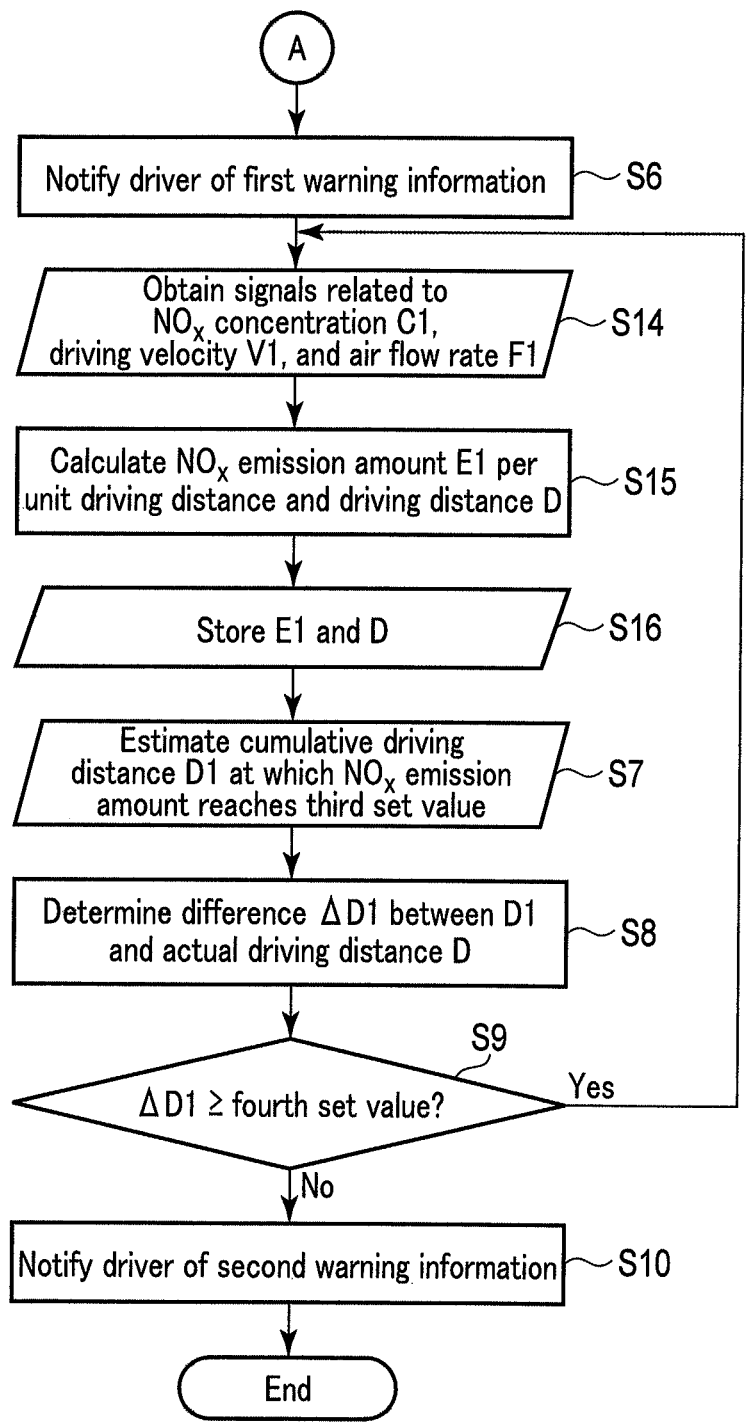
FIG. 13 is a flowchart showing the rest of the control partially shown in FIG. 12.

FIG. 12 is a flowchart showing a part of another example of control performed by the exhaust gas-purifying system shown in FIG. 2. FIG. 13 is a flowchart showing the rest of the control partially shown in FIG. 12.

The control shown in FIGS. 12 and 13 is similar to the control described with reference to FIG. 3 except for the following points. That is, under the control shown in FIGS. 12 and 13, the controlling section 80 executes steps S11 to S13 between step S4 and step S5, and executes steps S14 to S16 between step S6 and step S7. Steps S11 to S13 are the same as steps S1 to S3, respectively. Steps S14 to S16 are the same as steps S1 to S3, respectively. If the processing section 810 makes a judgment of "Yes" in step S5, the controlling section 80 executes again the sequence including steps S11 to S13 and S5. If the processing section 810 makes a judgment of "Yes" in step S9, the controlling section 80 executes again the sequence including steps S14 to S16 and S7 to S9.

Under the control shown in FIG. 3, if judgment results in steps S5 and S9 are "Yes", the operations return to step S1. On the other hand, under the controls shown in FIGS. 12 and 13, if judgment results in steps S5 and S9 are "Yes", the operations return to steps S11 and S14, respectively, without returning to step S1. That is, in the latter control, if a judgment result in step S4 is "No", step S4 is not executed again, and if a judgment result in step S5 is "No", step S5 is not executed again. Even the case where such control is performed can produce the same effect as in the case where the control described with reference to FIG. 3 is performed.

Figure 14:
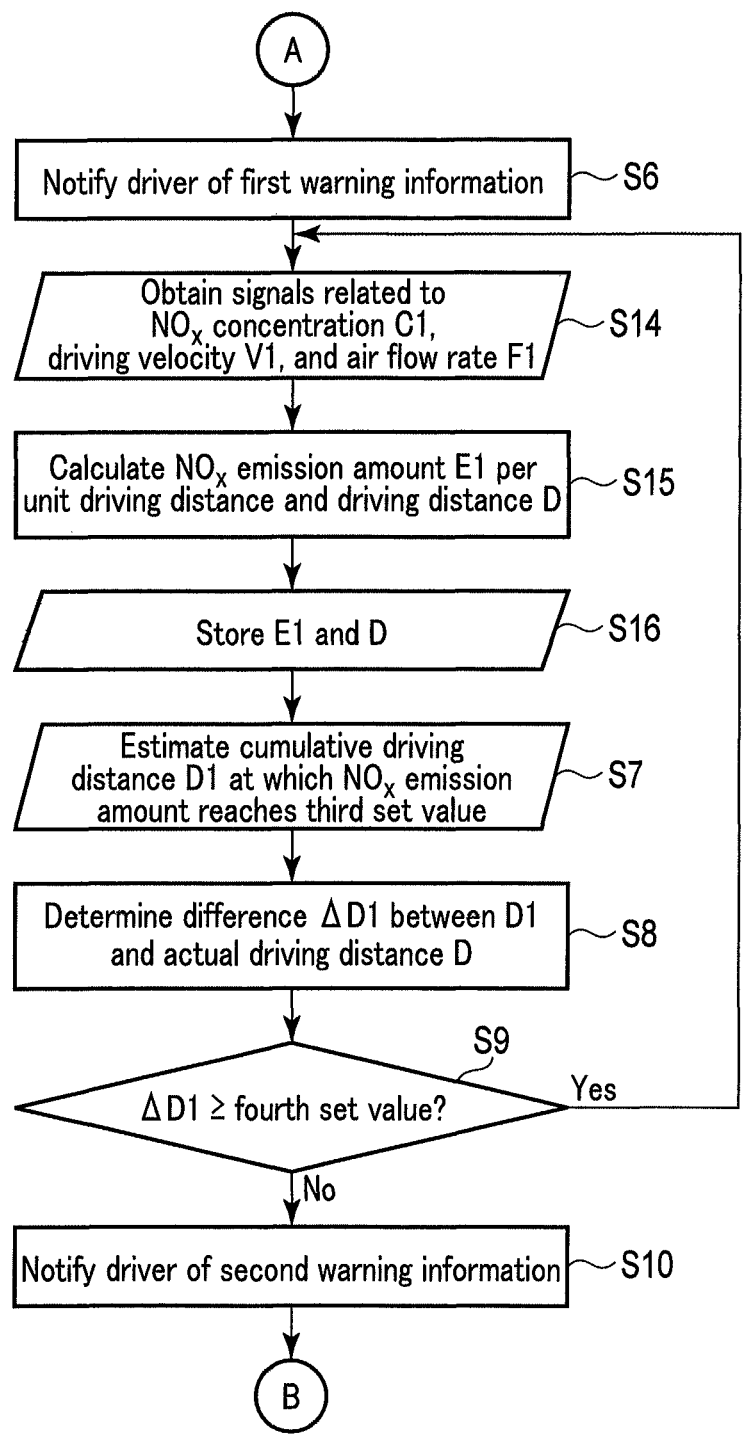
FIG. 14 is a flowchart showing a part of yet another example of control performed by the exhaust gas-purifying system shown in FIG. 2.
Figure 15:
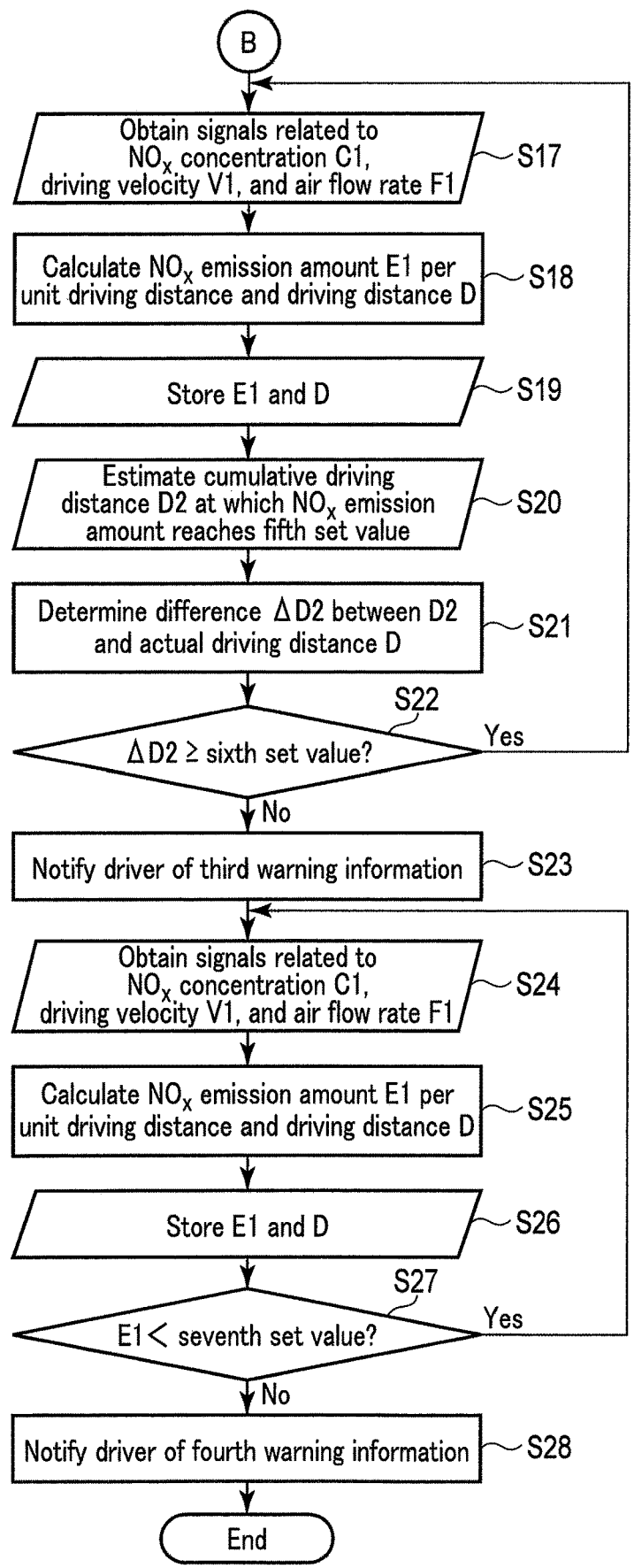
FIG. 15 is a flowchart showing another part of the control partially shown in FIG. 14.

FIG. 14 is a flowchart showing a part of yet another example of control performed by the exhaust gas-purifying system shown in FIG. 2. FIG. 15 is a flowchart showing another part of the control partially shown in FIG. 14.

The control shown in FIGS. 14 and 15 is similar to the control described with reference to FIGS. 12 and 13 except that the steps shown in FIGS. 14 and 15 are executed instead of the steps shown in FIG. 13.

That is, under the control shown in FIGS. 14 and 15, the controlling section 80 first executes steps S17 to S19 after step S10. Steps S17 to S19 are the same as steps S1 to S3 described above, respectively.

Next, the controlling section 80 executes steps S20 to S22.

Step S20 is the same as step S7 except that a cumulative driving distance D2 is estimated instead of the cumulative driving distance D1 using a fifth set value instead of the third set value. The fifth set value may be equal to or different from the third set value. In the latter case, the fifth set value may be less or greater than the third set value. Herein, as an example, the fifth set value is equal to the third set value.

Step S21 is the same as step S8 except that a difference ΔD2 (=D2−D) is calculated instead of the difference ΔD1 using the cumulative driving distance D2 instead of the cumulative driving distance D1.

Step S22 is the same as step S9 except that the difference Δ2 and a sixth set value are used instead of the difference ΔD1 and the fourth set value, respectively. The sixth set value is a value less than the fourth set value. Herein, as an example, the fourth set value is 20,000 km and the sixth set value is 10,000 km.

If the processing section 810 makes a judgment of "Yes" in step S22, the controlling section 80 executes again the sequence including steps S17 to S22. If the processing section 810 makes a judgment of "No" in step S22, the controlling section 80 outputs a video signal corresponding to third warning information to the display section 100. The display section 100 notifies a driver of the third warning information by displaying it (step S23 in FIG. 15).

Next, the controlling section 80 executes steps S24 to S26. Steps S24 to S26 are the same as steps S1 to S3 described above, respectively.

Next, the controlling section 80 executes step S27. Step S27 is the same as step S5 except that a seventh set value is used instead of the second set value. The seventh set value is a value greater than the second set value.

If the processing section 810 makes a judgment of "Yes" in step S27, the controlling section 80 executes again the sequence including steps S24 to S27. If the processing section 810 makes a judgment of "No" in step S27, the controlling section 80 outputs a video signal corresponding to fourth warning information to the display section 100. The display section 100 notifies a driver of the fourth warning information by displaying it (step S28 in FIG. 15). The fourth warning information is, for example, information indicating that at least one of the exhaust gas-purifying catalysts 712 and 722 and the diesel particulate filter 713 should be replaced.

According to this control, more warning images are displayed on the display section 100 as compared to the control described with reference to FIG. 3 and the control described with reference to FIGS. 12 and 13. Accordingly, when the above control is performed on automobile 1, not only a possibility that the $NO_x$ in amount exceeding a reference value is emitted in actual driving is further reduced but also a possibility that the replacement time of an exhaust gas-purifying catalyst, etc., is missed is further reduced.

Described as an example above is the case in which the combustion engine is a diesel engine; however, the combustion engine may be another type of internal combustion engine such as a gasoline engine, or may be an external combustion engine. In the above example, output of the combustion engine is used as a propulsive force. However, output of the combustion engine may be used to generate electric power, and output of another device driven by the generated electric power, such as output of a motor may be used as a propulsive force.

In the above description, a four-wheeled vehicle has been described as an example of the automotive vehicle; however, the automotive vehicle may be a vehicle other than the four-wheeled vehicle, for example, a two-wheeled vehicle, a multi-wheeled vehicle with five or more wheels, a mobile heavy machine, a railway vehicle, a ship, or an airplane.

What is claimed is:

1. An exhaust gas-purifying system that purifies exhaust gas emitted by a combustion engine mounted on an automotive vehicle, comprising:
   an exhaust gas-purifying unit that includes one or more exhaust gas-purifying catalysts, is supplied with the exhaust gas from the combustion engine, and purifies the exhaust gas so that the exhaust gas can be released to the atmosphere;

a sensor that detects a concentration of nitrogen oxides contained in the exhaust gas purified by the exhaust gas-purifying unit; and a processing section that includes a central processing unit and makes a first judgment with respect to at least one of the one or more exhaust gas-purifying catalysts, as to whether or not a performance is maintained at a sufficient level, based on the concentration detected by the sensor, wherein the processing section calculates for each time interval amongst two or more time intervals, an amount of nitrogen oxides emitted by the automobile vehicle per unit driving distance from the concentration detected by the sensor within the time interval, an amount or a flow rate of air supplied to the combustion engine within the time interval or an amount or a flow rate of the exhaust gas emitted by the combustion engine within the time interval, and a driving distance or a driving velocity of the automotive vehicle within the time interval, and estimates by extrapolation a cumulative driving distance at which the amount of nitrogen oxides emitted by the automotive vehicle per unit driving distance reaches a third set value, from a change in the amount of nitrogen oxides emitted by the automotive vehicle per unit driving distance with respect to an actual cumulative driving distance of the automotive vehicle.

2. The exhaust gas-purifying system according to claim 1, wherein if the concentration detected by the sensor is less than a first set value or is less than or equal to the first set value, the processing section makes the first judgment with respect to the at least one of the one or more exhaust gas-purifying catalysts, that the performance is maintained at the sufficient level.

3. The exhaust gas-purifying system according to claim 1, wherein the processing section makes the first judgment with respect to the at least one of the one or more exhaust gas-purifying catalysts, that the performance is maintained at the sufficient level, if the calculated amount is less than a second set value or is less than or equal to the second set value.

4. The exhaust gas-purifying system according to claim 1, wherein if a difference between the estimated cumulative driving distance and the actual cumulative driving distance is less than a fourth set value or is less than or equal to the fourth set value, the processing section makes a second judgment with respect to the at least one of the one or more exhaust gas-purifying catalysts that a replacement is necessary or a replacement time is approaching.

5. The exhaust gas-purifying system according to claim 1, further comprising an output section that outputs a result of processing in the processing section and includes at least one of a display, a light-emitting diode, a wired or wireless communication unit, and a buzzer or a voice guidance device.

6. The exhaust gas-purifying system according to claim 1, wherein the combustion engine is a diesel engine, and the one or more exhaust gas-purifying catalysts include at least one of a storage and reduction catalyst, a urea selective reduction catalyst, and a hydrocarbon selective reduction catalyst.

7. The automotive vehicle comprising the exhaust gas-purifying system according to of claim 1.

8. The automotive vehicle according to claim 7, wherein if the concentration detected by the sensor is less than a first set value or is less than or equal to the first set value, the processing section makes the first judgment with respect to the at least one of the one or more exhaust gas-purifying catalysts, that the performance is maintained at the sufficient level.

9. The automotive vehicle according to claim 7, wherein the processing section makes the first judgment with respect to the at least one of the one or more exhaust gas-purifying catalysts, that the performance is maintained at the sufficient level, if the calculated amount is less than a second set value or is less than or equal to the second set value.

10. The automotive vehicle according to claim 7, wherein if a difference between the estimated cumulative driving distance and the actual cumulative driving distance is less than a fourth set value or is less than or equal to the fourth set value, the processing section makes a second judgment with respect to the at least one of the one or more exhaust gas-purifying catalysts that a replacement is necessary or a replacement time is approaching.

11. The automotive vehicle according to claim 7, further comprising an output section that outputs a result of processing in the processing section and includes at least one of a display, a light-emitting diode, a wired or wireless communication unit, and a buzzer or a voice guidance device.

12. The automotive vehicle according to claim 7, wherein the combustion engine is a diesel engine, and the one or more exhaust gas-purifying catalysts include at least one of a storage and reduction catalyst, a urea selective reduction catalyst, and a hydrocarbon selective reduction catalyst.

* * * * *